United States Patent
Palinkas

(10) Patent No.: US 6,600,900 B1
(45) Date of Patent: Jul. 29, 2003

(54) SYSTEM AND METHOD PROVIDING BI-DIRECTIONAL COMMUNICATION SERVICES BETWEEN A SERVICE PROVIDER AND A PLURALITY OF SUBSCRIBERS

(75) Inventor: Raymond W. Palinkas, Canastota, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 0 days.

(21) Appl. No.: 09/568,326

(22) Filed: May 9, 2000

(51) Int. Cl.[7] ............................................... H04N 7/173
(52) U.S. Cl. ...................... 455/3.05; 455/3.04; 725/128
(58) Field of Search .................... 455/339, 4.1, 348, 455/5.1, 3.04, 3.05; 348/349; 725/127–128, 149

(56) References Cited

U.S. PATENT DOCUMENTS

| | | | |
|---|---|---|---|
| 4,982,440 A | | 1/1991 | Dufresne et al. |
| 5,109,286 A | * | 4/1992 | West et al. .................... 380/52 |
| 5,126,840 A | * | 6/1992 | Dufresne et al. ............ 455/306 |
| 5,622,524 A | * | 4/1997 | Dirmeyer ................. 252/62.54 |
| 5,742,713 A | | 4/1998 | Sanders et al. |
| 5,745,838 A | * | 4/1998 | Tresness et al. ............. 725/128 |
| 5,768,682 A | | 6/1998 | Peyrovian |
| 5,826,167 A | | 10/1998 | Jelined et al. |
| 5,881,362 A | | 3/1999 | Eldering et al. |
| 5,915,205 A | | 6/1999 | Chen |
| 5,937,330 A | | 8/1999 | Vince et al. |
| 5,963,854 A | * | 10/1999 | Andreasson et al. ........ 333/134 |
| 5,990,929 A | | 11/1999 | Sanduluk |
| 6,026,458 A | * | 2/2000 | Rasums ....................... 710/302 |
| 6,049,693 A | | 4/2000 | Baran et al. |

FOREIGN PATENT DOCUMENTS

| | | |
|---|---|---|
| EP | 0 859 514 A2 | 8/1998 |
| WO | WO 98/07276 | 2/1998 |

* cited by examiner

Primary Examiner—Thanh Cong Le
Assistant Examiner—Tan Trinh
(74) Attorney, Agent, or Firm—Alston & Bird, LLP

(57) ABSTRACT

A telecommunications system for bi-directional communication services between a service provider and a plurality of subscribers wherein return signals associated with the bi-directional communication services utilize a first frequency band. The system includes a head-end facility for sending forward signals from the service provider and for receiving return signals from one or more of the subscribers; at least one main distribution line extending from the head-end facility; a plurality of feeder lines for serving the plurality of subscribers, each feeder line being connected to the main distribution line at a feeder tap location; a local distribution amplifier unit disposed in the main distribution line between the head-end facility and the feeder tap locations, the amplifier unit including forward-path amplifier circuitry for amplifying forward signals traveling from the service provider to the subscribers, the amplifier unit further including return-path amplifier circuitry for amplifying return signals traveling from one or more of the subscribers to the service provider; and a return-path filter disposed between the head-end facility and the feeder tap locations, the return-path filter being operable to attenuate signals outside the first frequency band while allowing signals within the first frequency band to pass substantially unattenuated, whereby the return-path filter reduces transmission of ingress noise from each of the plurality of subscribers.

3 Claims, 5 Drawing Sheets

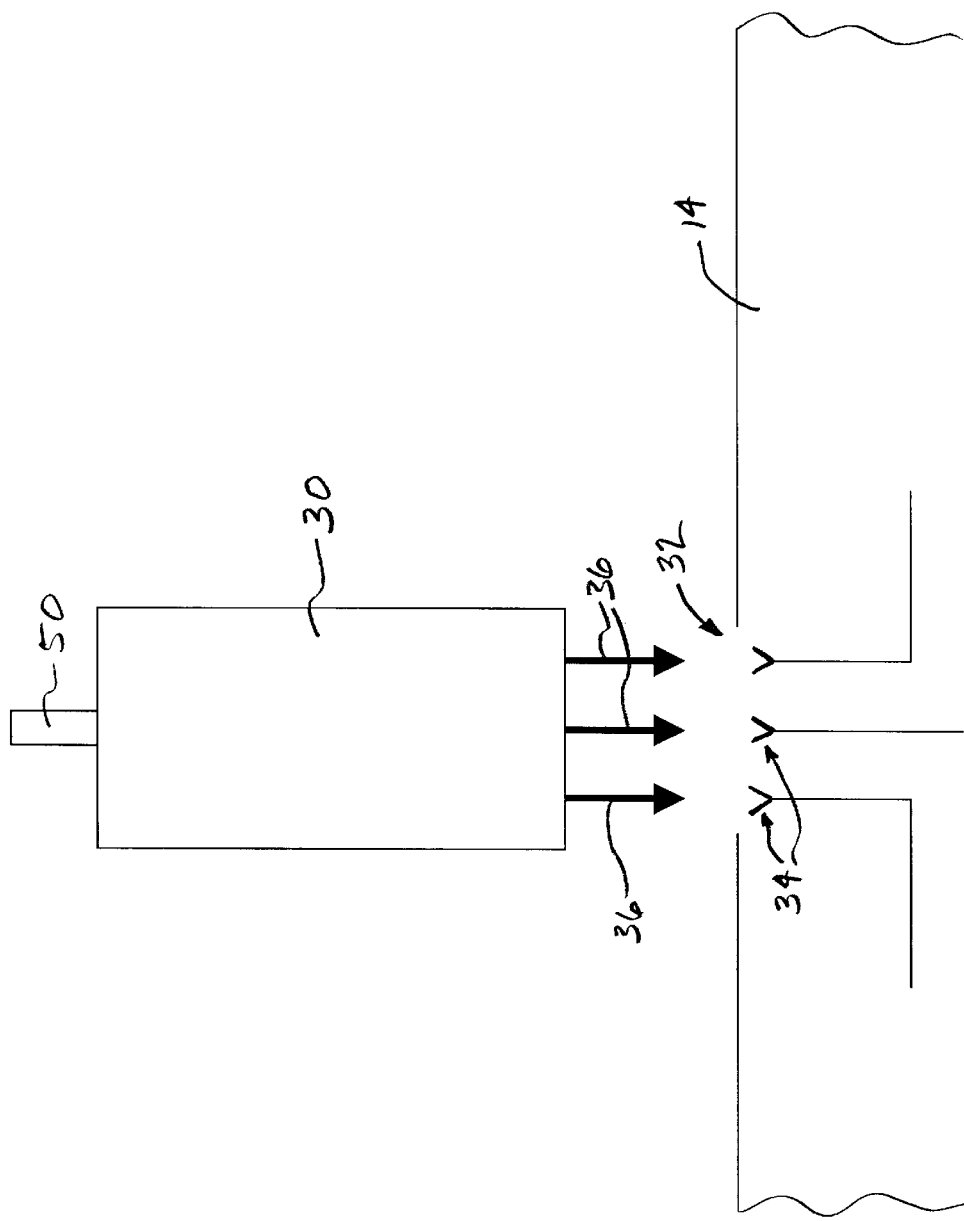

SYSTEM AND METHOD PROVIDING BI-DIRECTIONAL COMMUNICATION SERVICES BETWEEN A SERVICE PROVIDER AND A PLURALITY OF SUBSCRIBERS

FIELD OF THE INVENTION

The present invention relates generally to telecommunication systems, and relates more particularly to cable television systems and methods for isolating upstream ingress noise in a bi-directional cable system.

BACKGROUND OF THE INVENTION

Cable communication systems typically comprise a head-end facility from which a plurality of main distribution lines emanate in a hub-and-spoke arrangement. Each main distribution line serves one or more local distribution networks each of which services a relatively small number (e.g., about 100 to 250) of individual subscribers. Each subscriber is connected with the main distribution line via a feeder line that taps into the main distribution line at a feeder tap location.

The coaxial cable portions of the cable system installed by the service provider generally have high-quality shielding to effectively prevent radio frequency noise from being picked up by the coaxial cable portions and transmitted through the system. However, at weak points in the network such as shield discontinuities, faulty connectors, and the settop terminals installed in the subscribers' homes, radio frequency electromagnetic signals can leak into the cable. Ingress noise interferes with the desired signals transmitted over the network. There are various potential sources of ingress noise, including radio transmissions by two-way dispatch services, amateur radio transmissions, ignition noise from automobile engines, electric motors in household appliances, and the like. These emissions can be picked up by the coaxial cable via unterminated cable stubs in the subscriber's home because the stubs tend to act as antennas.

In the early history of cable television, communications were strictly unidirectional, i.e., from the service provider to the subscribers. Accordingly, any ingress noise originating in a given subscriber's premises could deleteriously affect that subscriber's reception, but other subscribers were not affected by it. More recently, however, many service providers have begun to offer bidirectional services in which signals are also sent from the subscribers to the service provider. For example, cable television (CATV) service providers frequently offer impulse pay-per-view services where the subscriber may impulsively select an event for viewing and incur a charge. The pay-per-view service employs at least one data channel such as a telephone communication channel or an RF channel in an upstream (reverse) direction from the cable television subscriber to a cable television head-end for reporting service usage data. Other uses for a return path include internet access, active device status monitoring, power meter reading, alarm services, subscriber polling and voting, collecting subscriber viewing statistics, home shopping, and telephony.

Bi-directional cable communication systems usually utilize one frequency band for forward or downstream signals that are sent from the service provider to the subscribers, and a different frequency band for return or upstream signals sent from the subscribers to the service provider. These systems have typically used the higher of the frequency bands for forward transmission and the lower of the frequency bands for reverse transmission. Forward transmissions, for example, have been provided in the 54–550 MHz band. Reverse transmissions have generally been provided in the 5 to 40 MHz band.

Ingress noise can appear in either the upstream or downstream portion of the cable transmission frequency spectrum. Upstream ingress noise is particularly troublesome to cable service providers because the individual sources of ingress noise from various weak points in the system are added together and are amplified right along with the desired return signals being transmitted in the upstream direction.

Accordingly, the resulting ingress noise reaching the head-end can seriously interfere the reception of the desired return signals.

One method of reducing ingress noise from individual subscribers is to place a filter at the tap location of each subscriber that does not use upstream communication equipment. This limits the ingress noise sources to tap locations corresponding to homes that utilize the upstream communication path. However, since many of the services offered by CATV providers are interactive, a large proportion of the total homes served by the provider may utilize the upstream communication path. Therefore, this method of reducing ingress noise has limited benefits. Furthermore, where a large number of subscribers do not use the upstream communication path, the method requires a large number of filters, i.e., one for each such subscriber.

As an example of another technique that has been proposed for reducing ingress noise, U.S. Pat. No. 5,235,619 discloses a bi-directional CATV communication system which compensates for unwanted ingress noise by redundantly communicating each message from the settop terminals in the subscribers' homes to the head-end over a plurality of frequencies and time slots. The head-end receives and compares the redundant transmissions to confirm the transmitted message. This system requires high-speed hardware to be located both at the head-end and at each settop terminal, resulting in a system that is inefficient and expensive.

SUMMARY OF THE INVENTION

The above needs are met and other advantages are achieved by the present invention, which provides a system and method for providing bi-directional communication between a service provider and a plurality of subscribers, in which a single return-path filter is employed for reducing ingress noise originating from a plurality of subscribers. More particularly, the invention provides a telecommunications system for bi-directional communication services between a service provider and a plurality of subscribers wherein return signals associated with the bi-directional communication services utilize a first frequency band. The system includes a head-end facility for sending forward signals from the service provider and for receiving return signals from one or more of the subscribers; at least one main distribution line extending from the head-end facility; a plurality of feeder lines for serving the plurality of subscribers, each feeder line being connected to the main distribution line at a feeder tap location; a local distribution amplifier unit disposed in the main distribution line between the head-end facility and the feeder tap locations, the amplifier unit including forward-path amplifier circuitry for amplifying forward signals traveling from the service provider to the subscribers, the amplifier unit further including return-path amplifier circuitry for amplifying return signals traveling from one or more of the subscribers to the service provider; and a return-path filter disposed between the head-end facility and the feeder tap locations, the return-path filter being operable to attenuate signals outside the first frequency band while allowing signals within the first frequency band to pass substantially unattenuated, whereby the return-path filter reduces transmission of ingress noise from each of the plurality of subscribers.

In a preferred embodiment of the invention, the amplifier unit includes a receptacle for receiving an optional plug-in electrical device, and the return-path filter is installed in the receptacle. For example, CATV systems frequently include a distribution amplifier for a relatively small number (e.g., about 100 to 250) subscribers, which may constitute a neighborhood or the like. The distribution amplifier often includes ports or slots into which optional electrical devices such as simple flat-loss attenuator pads can be inserted into the return path of the amplifier if desired. In other cases, the ports or slots are used for adding thermal compensation units to the amplifier to stabilize the gain of the return-path amplifier over a range of temperatures. In accordance with the present invention, the return-path filter is configured to be received in such a port or slot of the distribution amplifier. Therefore, rather than having to install multiple return-path filters at each subscriber location and incurring the associated installation costs, one filter can be used at the amplifier to achieve the same results.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 5 is a diagrammatic view of a return-path amplifier unit showing a return-path filter in accordance with the invention being plugged into an available port of the amplifier unit.

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
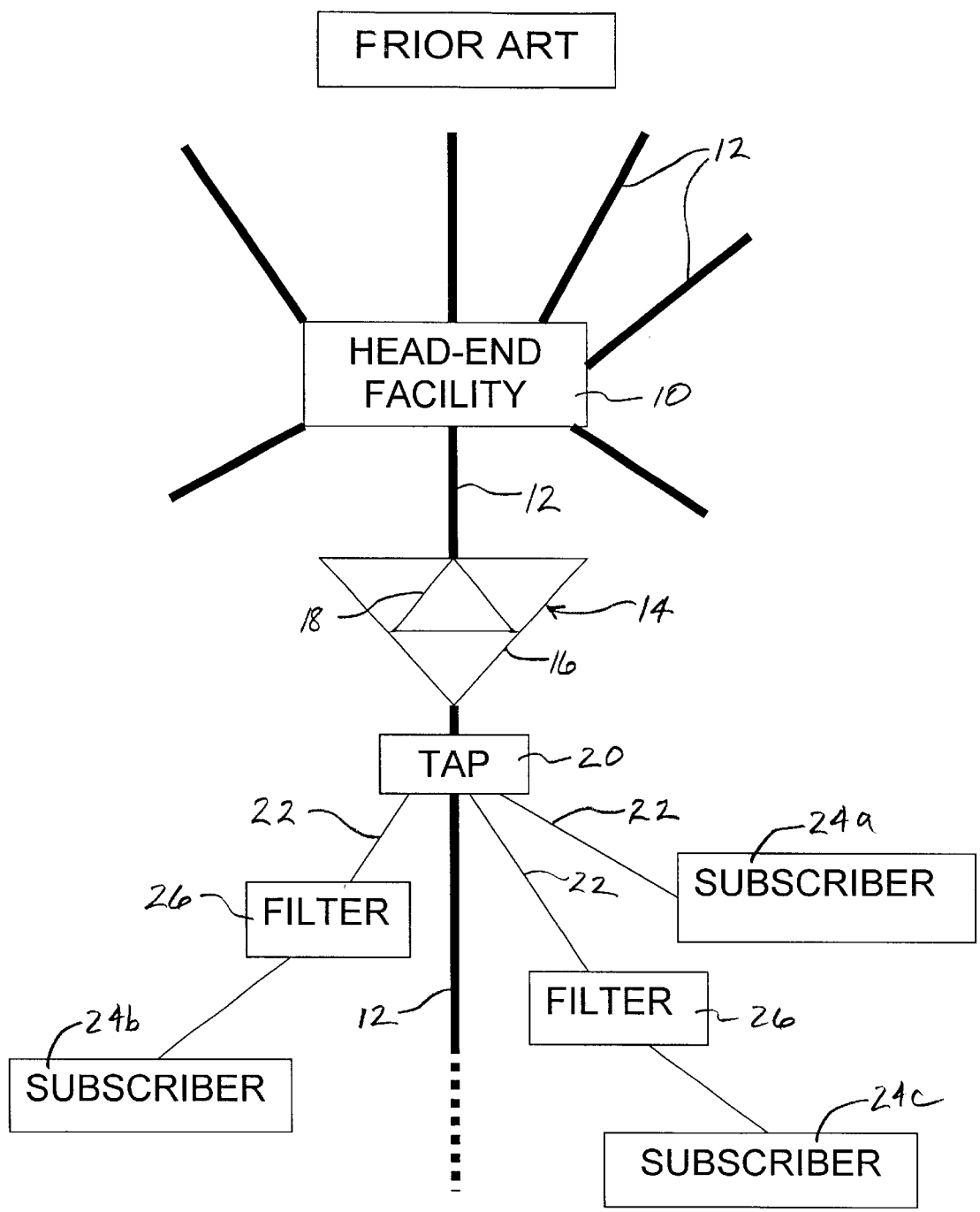
FIG. 1 is a diagrammatic view of a cable distribution system in accordance with the prior art.

With reference first to FIG. 1, a prior art cable system is illustrated. The system includes a head-end facility 10 that serves as a central point of a hub-and-spoke distribution system. Thus, emanating from the head-end facility 10 are a plurality of main distribution lines 12, which can comprise fiber optic cables or coaxial cables. At intervals along the length of a main distribution line 12, a distribution amplifier unit 14 is provided for boosting the signal strength of signals sent in both the forward and return directions. The amplifier unit 14 accordingly includes forward-path amplifier circuitry 16 and return-path amplifier circuitry 18. Typically, a relatively short distance downstream of an amplifier unit 14, there is provided a feeder tap unit 20 that accommodates one to a plurality of feeder lines 22 so that the feeder lines can tap into the main distribution line 12 to connect each of a plurality of individual subscribers 24a, 24b, 24c with the main distribution line. In FIG. 1, three feeder lines 22 and three subscribers are shown, but it will be understood that in practice a substantially larger number (e.g., about 100 to 250) of subscribers may tap into the portion of the main distribution line served by the amplifier unit 14.

In FIG. 1, subscribers 24b and 24c represent homes that use services of the service provider requiring only unidirectional communications, whereas subscriber 24a represents a home that uses a service requiring bi-directional communications. To reduce propagation of ingress noise in the upstream direction, the prior art system of FIG. 1 employs a return-path filter 26 either in the home or in the feeder line leading to the home of each subscriber that does not use bi-directional services. Thus, subscribers 24b and 24c have return-path filters 26. However, the subscriber 24a who uses bi-directional services does not have a return-path filter. As previously noted, if a large number of subscribers do not use bi-directional services, then a large number of return-path filters 26 are required, leading to a high cost for parts and installation.

Figure 2:
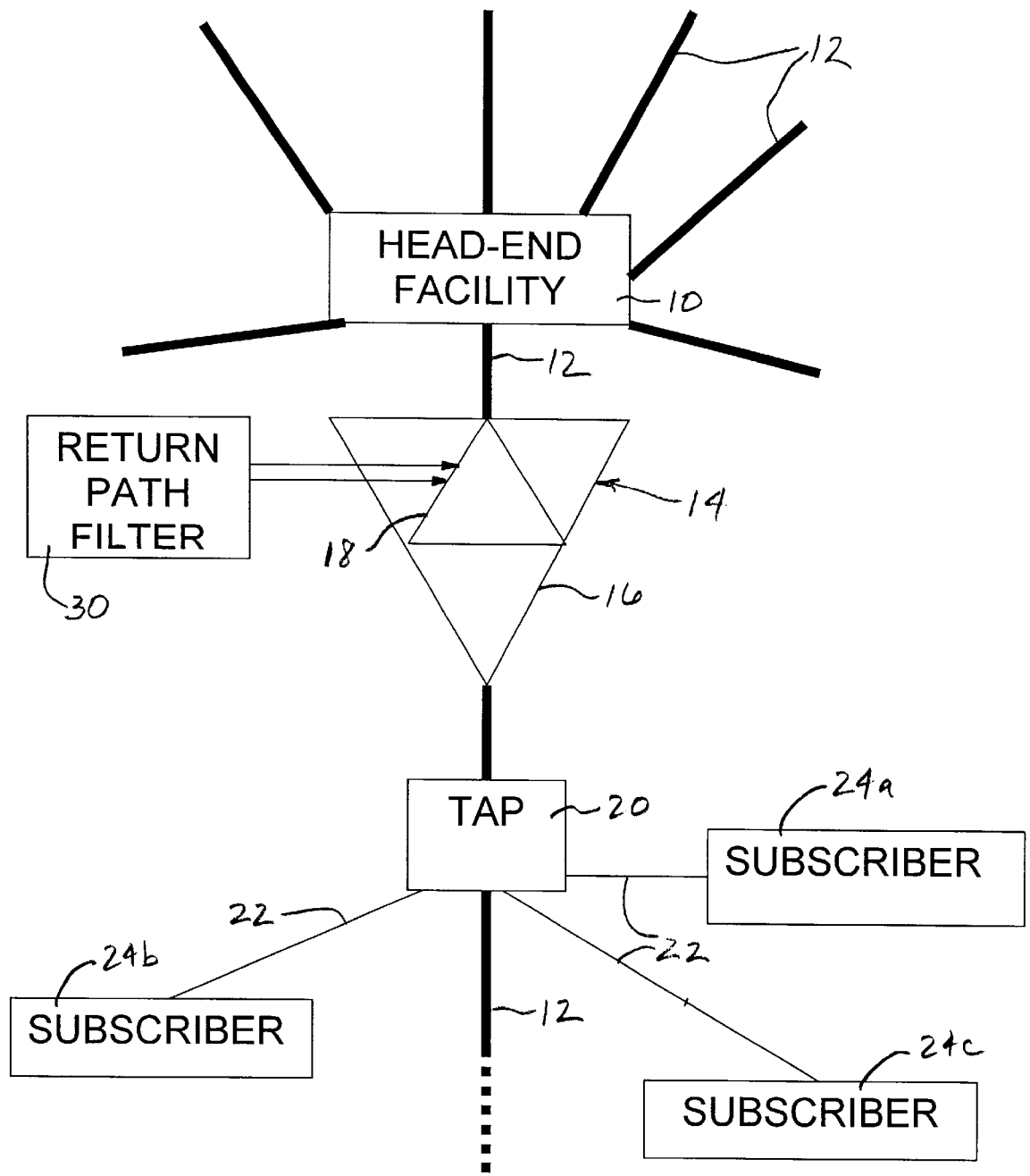
FIG. 2 is a diagrammatic view of a cable distribution system in accordance with a preferred embodiment of the invention.

FIG. 2 diagrammatically illustrates a cable system in accordance with a preferred embodiment of the invention. The invention employs a single return-path filter 30 for a plurality of subscribers 24a, 24b, 24c, etc., served by the distribution amplifier unit 14. More particularly, upstream of the feeder tap unit 20, the return-path filter 30 is inserted into the return path so that signals traveling upstream along the return path, and whose frequencies do not lie within the frequency band used for reverse transmissions of the bi-directional services, are attenuated. While ingress noise may occupy a broad frequency spectrum, typically a relatively small fraction of the total ingress energy will lie within the frequency band used by the bi-directional services provided by the service provider. Thus, by attenuating return signals outside the frequency band used by the bi-directional services for reverse transmissions, the total ingress noise energy level propagated upstream to the head-end facility is substantially reduced.

Preferably, the return-path filter 30 is configured as a plug-in module compatible with a port or receptacle that is commonly provided in the return path of many amplifier units 14 that are in general use in cable system architectures. FIG. 2 schematically depicts the return-path filter 30 being plugged into the return path circuitry of the amplifier unit 14. In many such amplifier units 14, the return path circuitry includes one or more standardized ports, such as JXP ports (three pin receptacles arranged in-line) or SXP ports (three pin receptacles arranged in a for receiving appropriately configured pin arrangements of plug-in modules. For example, simple flat-loss attenuator pads are sometimes plugged into the ports to tailor the overall gain of the return amplifier to a desired level, as described for instance in U.S. Pat. No. 5,990,929, the disclosure of which is incorporated herein by reference. Alternatively, thermal compensation units can be plugged into the ports to stabilize the return amplifier gain over a wide range of temperature. One type of distribution amplifier unit in common usage is the STAR- LINE® Mini-Bridger Distribution Amplifier available from General Instrument Corporation of Horsham, Pennsylvania. The STARLINE® amplifier includes return-path JXP ports that can be used by the return-path filter 30 in accordance with the present invention.

FIG. 5 schematically illustrates the return-path filter 30 being inserted into a port 32 in the amplifier unit 14. The port 32 includes three receptacles 34 for receiving three pins 36 of the filter 30. Of course, it will be recognized that various numbers, configurations, and arrangements of pins and receptacles can be used for connecting the return-path filter into the return path circuitry of the amplifier unit.

Figure 3:
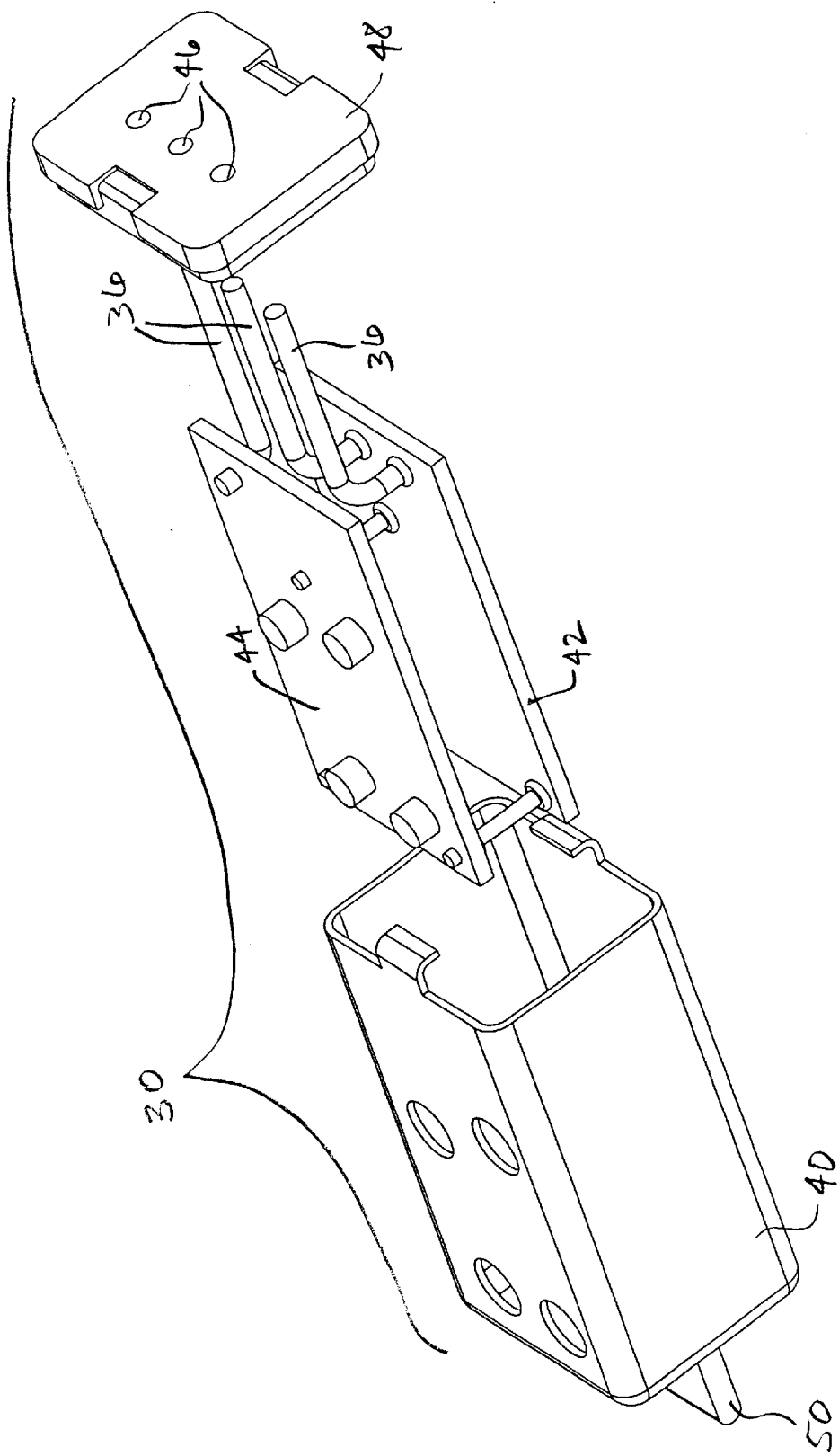
FIG. 3 is an exploded perspective view of a return-path filter in accordance with a preferred embodiment of the invention.
Figure 4:
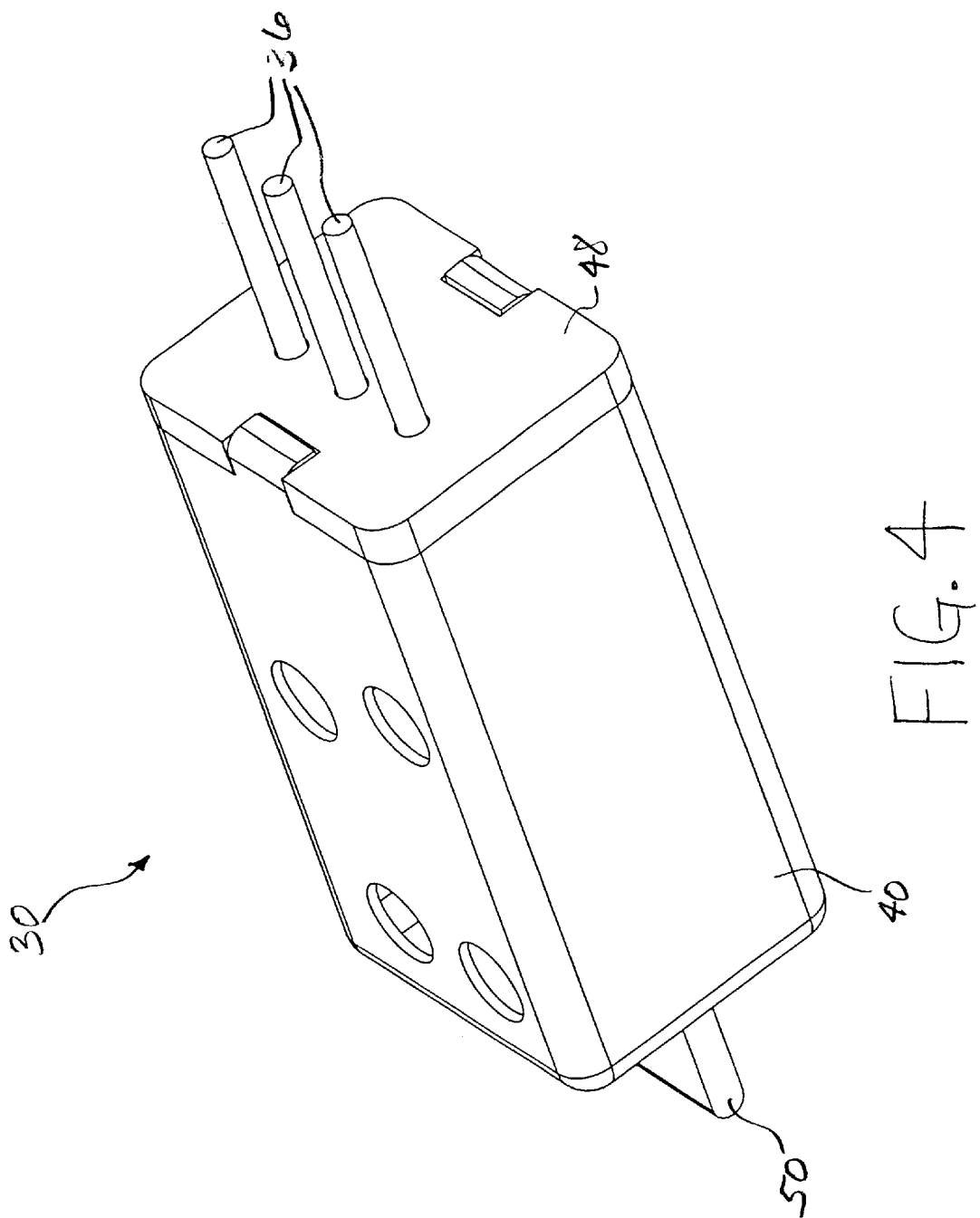
FIG. 4 is a perspective view of the return-path filter in assembled condition.

FIGS. 3 and 4 illustrate a particularly preferred embodiment of a return-path filter 30 in accordance with the present invention configured to be inserted into a standard JXP port of an amplifier unit. The filter 30 is configured similarly to the simple attenuator pads that are commonly used with the amplifier units. The filter 30 includes a housing 40 that contains a pair of circuit boards 42, 44 that are interconnected. The circuit boards 42, 44 include inductors and capacitors (not specifically illustrated) selected and arranged to achieve a desired frequency response for the filter. Three pins 36 are connected to the circuit board, and pass through apertures 46 in a cover 48 of the housing 40 such that the pins project outward from the housing. The pins 36 are arranged in a straight line so as to be compatible with a standard JXP port. The housing has a handle 50 mounted thereon to facilitate grasping the filter for inserting and removing it from the port in the amplifier unit.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A telecommunications system for bi-directional communication services between a service provider and a plurality of subscribers wherein return signals associated with the bi-directional communication services utilize a first frequency band, comprising:

a head-end facility for sending forward signals from the service provider and for receiving return signals from one or more of the subscribers;

at least one main distribution line extending from the head-end facility;

a plurality of feeder lines for serving the plurality of subscribers, each feeder line being connected to the main distribution line at a feeder tap location;

a local distribution amplifier unit disposed in the main distribution line between the head-end facility and the feeder tap locations, the amplifier unit including forward-path amplifier circuitry for amplifying forward signals traveling from the service provider to the subscribers, the amplifier unit further including return-path amplifier circuitry for amplifying return signals traveling from one or more of the subscribers to the service provider, and a port in the return-path circuitry for receiving an optional plug-in electrical device; and a return-path filter installed in the port of the local distribution amplifier, the return-path filter being operable to attenuate signals outside said first frequency band while allowing signals within said first frequency band to pass substantially unattenuated, whereby the return-path filter reduces transmission of ingress noise from each of the plurality of subscribers.

2. The telecommunications system of claim 1, further comprising a plurality of the main distribution lines connected to the head-end facility in a hub-and-spoke arrangement, a plurality of the distribution amplifier units respectively coupled with the main distribution lines, wherein each amplifier unit includes a port for receiving an optional plug-in electrical device, and wherein one of the return-path filters is installed in the port of each amplifier unit.

3. A method for providing bi-directional communication services between a service provider and a plurality of subscribers, the method comprising:

transmitting forward signals associated with the bi-directional communication services from the service provider to the subscribers in a forward direction along a main distribution line and a plurality of feeder lines respectively connected to the main distribution line at feeder tap locations;

transmitting return signals associated with the bi-directional communication services from the subscribers to the service provider in a return direction along the respective feeder lines and the main distribution line, the return signals utilizing a first frequency band, the return signals being amplified by return-path amplifier circuitry contained in the distribution amplifier, the distribution amplifier having a port in the return-path circuitry for receiving an optional plug-in electrical device; and passing the return signals through a return-path filter installed in the port in the distribution amplifier, the return-path filter attenuating signals outside the first frequency band while allowing signals within the first frequency band to pass substantially unattenuated, whereby the return-path filter reduces ingress noise from each of the plurality of subscribers.

\* \* \* \* \*